(12) United States Patent
Lassota et al.

(10) Patent No.: US 6,845,704 B2
(45) Date of Patent: Jan. 25, 2005

(54) BEVERAGE MAKING SYSTEM WITH FLOW METER MEASUREMENT CONTROL AND METHOD

(75) Inventors: Zbigniew G. Lassota, Long Grove, IL (US); Michael W. Lassota, Bartlett, IL (US)

(73) Assignee: Food Equipment Technologies Company, Inc., Lincolnshire, IL (US)

( * ) Notice: Subject to any disclaimer, the term of this patent is extended or adjusted under 35 U.S.C. 154(b) by 0 days.

(21) Appl. No.: 10/078,600

(22) Filed: Feb. 19, 2002

(65) Prior Publication Data

US 2003/0126993 A1 Jul. 10, 2003

Related U.S. Application Data

(60) Provisional application No. 60/270,108, filed on Feb. 20, 2001.

(51) Int. Cl.[7] .............................. A47J 31/40; A47J 31/56
(52) U.S. Cl. ............................................. 99/280; 99/300
(58) Field of Search ................................. 426/597, 594, 426/433, 435; 99/280, 300

(56) References Cited

U.S. PATENT DOCUMENTS

| | | | | |
|---|---|---|---|---|
| 3,830,940 A | * | 8/1974 | Sivetz | 426/594 |
| 4,309,939 A | * | 1/1982 | Stover | 99/280 |
| 4,809,594 A | * | 3/1989 | Vitous | 99/280 |
| 5,207,148 A | * | 5/1993 | Anderson et al. | 99/281 |
| 5,255,593 A | * | 10/1993 | Bunn et al. | 99/280 |
| 5,303,639 A | * | 4/1994 | Bunn et al. | 99/289 R |
| 5,393,540 A | * | 2/1995 | Bunn et al. | 426/231 |
| 5,465,649 A | * | 11/1995 | Muis | 99/280 |
| 5,509,349 A | * | 4/1996 | Anderson et al. | 99/323.1 |
| 5,540,107 A | * | 7/1996 | Silverman et al. | 73/861.78 |
| 5,579,678 A | * | 12/1996 | Goerndt | 99/280 |
| 5,858,437 A | * | 1/1999 | Anson | 426/431 |
| 6,182,555 B1 | * | 2/2001 | Scheer et al. | 99/290 |
| 2003/0208419 A1 | * | 11/2003 | Bunn | 705/29 |

* cited by examiner

Primary Examiner—Anthony Weier
(74) Attorney, Agent, or Firm—James W. Potthast; Potthast & Associates

(57) ABSTRACT

A beverage brewing system (10) having a controller (52) responsive to a comparison of preselected values of total brew water and total diluent water stored in a program memory (62) and to actual quantities measured by one or two flow meter (36, 36') to control operation of a brew valve (46) passing water to a hot water tank (14) and a diluent valve (50) for passing water directly to a mixing chamber (28). The controller is also responsive to a level sensor (20) to control the brew valve (46) to keep the hot water tank filled with water. The preselected amounts may be changed for different brewing conditions to obtain different total quantities of beverage or different ratios of hot brew water passed through the brew basket (24) to cold diluent water passed directly to the mixing chamber, or serving urn (28).

41 Claims, 7 Drawing Sheets

BEVERAGE MAKING SYSTEM WITH FLOW METER MEASUREMENT CONTROL AND METHOD

CROSS REFERENCE TO RELATED PROVISIONAL APPLICATION

This application claims, under 35 U.S.C. 119(e), the benefit of U.S. Provisional Application No. 60/270,108, filed Feb. 20, 2001, bearing the same title and having the same named inventor as the present application.

BACKGROUND OF THE INVENTION

1. Field of the Invention

This invention generally relates to beverage making systems of the type in which freshly brewed hot tea extract; is added to and mixed with cold water to make the final beverage.

2. Discussion of the Prior Art

Fresh brewed iced tea makers or fresh iced tea making systems, brew an extract of tea by selectively passing hot water from a hot water, tank through a brew basket containing the dry tea ingredient. The components of the dry tea dissolve into the hot water to form a concentrated liquid abstract of tea, or tea abstract. This tea abstract is then added into a mixing and dispensing urn in which the abstract is mixed with cold water.

Generally, cold water from a public water source is used to fill the hot water tank to a preselected level needed for brewing the abstract, and an electrical heater in the tank heats the water to a preselected temperature needed for proper brewing. During the brew cycle, the level of hot water in the tank is reduced by the preselected amount of the hot water that is withdrawn. The cold water from the public source that is used to fill the hot water tank is also used to directly add the diluting water to the mixing and dispensing urn.

The passing of water into and out of the hot water tank is via a fill valve and a brew valve, respectively, and the passing of diluent directly into the mixing chamber is via a third, diluent valve, or mixing valve. A pressure regulator in-line between the water source and the diluent valve is required because the measurement of the quantity of water passed directly to the mixing chamber is based on timing the period that the diluent valve is opened during a uniform flow rate.

The fill valve is controlled by a level sensor to pass water to the hot water tank until it is filled with water to a preselected level of the level sensor. Then the water is heated to a preselected temperature needed for proper brewing by energizing the electrical heating element. During the dispense period, the brew valve is opened to drain a preselected fixed amount of hot water through a spray head into the brew basket containing the tea or other ingredient. Neither the amount of hot water that is passed through the brew basket nor the amount of cold mixing water that is passed directly to the mixing chamber may be changed to accommodate different brewing conditions or to make different total amounts of beverage.

While this known brewing system functions successfully to make fresh brewed iced tea, it has some limitations and disadvantages of various types. The dry tea ingredients are often prepackaged in standard quantities such that the amount of tea cannot be changed by less than the incremental quantity of an entire package. If loose tea leaves are used that are not prepackaged, the quantity of dry ingredient can be changed by small amounts if desired but this requires the time, training and effort and potential inaccuracy of measuring the quantity of tea desired. Consequently, it is not easy to change the strength of the tea by changing the quantity of dry tea ingredient that is place into the brew basket.

Moreover, in the known iced tea maker, neither the amount of extract nor the total quantity of iced tea created by mixing the extract with the diluting water or the ratio between the extract and the diluent may be changed. Consequently, the strength of the resulting quantity of iced tea may only be changed by changing the quantity of dry tea ingredient used during the brew cycle to brew the extract. As noted above, this is not an easy thing to do and to do repetitively with the same quantity to maintain consistency. The problem becomes worse when different types of teas are used with one system at different times that are inherently different in strength of flavor, color, and other characteristics.

Another problem with known ice tea brewing systems is that there is a relatively long recovery period after the conclusion of preparation of one batch of iced tea before another brew cycle can be started. The tank from which the hot water is drawn cannot be replenished until all of the desired quantity of hot water has drained out of the mixing chamber. Because the tank is emptied or drained during the dispense period, the rate of draining becomes less and less as the level of water in the tank is reduced. At the end, there is virtually no head pressure, and the hot water merely drips out of the hot water tank. This water then must seep through the ingredient, and as a result this drip period may extend substantially beyond the time that the dispense period has ended.

Then after the hot water tank has been fully emptied, it can be replenished with a new fill of the preselected amount of cold water as needed to begin another brew cycle. Then there is a further delay before the cold replenishment water that is added to the hot water tank is heated to the preselected minimum temperature needed for a proper brew.

The total length of the brew cycle is thereby extended and the throughput of the brewing system, i.e. the maximum quantity of tea that can be made in an hour when used repetitively to make as much beverage as possible over a period of multiple successive brew cycles, is significantly decreased.

The known iced tea brewing system has other disadvantages associated with solenoid controlled valves that are used for control of the flow of hot water into and out of the hot water tank. As noted, the known tea brewing system uses three valves including a brew valve, or dispense valve, interconnecting the hot water outlet to the brew basket through a spray head. The brew valve dispenses hot water from the hot water tank to a spray head overlying the brew basket that sprays the hot water onto the top of a layer of tea within the brew basket. Disadvantageously, because the brew valve is passing hot water it is subject to becoming clogged with calcium and other mineral deposits that condense out of the hot water an on to the surfaces of the brew valve during evaporation. This is generally referred to as "liming". This liming can interfere with they dependable operation of the brew valve to either open or close and thereby create potential safety hazards. In the past, preventative or responsive maintenance and possible valve replacement or the use of water softening chemicals and filters have been required to address this liming problem.

The inventors have noted that the other two valves, the fill valve and the mixing valve, are on the cold water side and do not suffer from liming to the same relatively high degree as does the brew valve.

In all known tea brewing systems all measurements are made by one of two different techniques. In one technique, a known quantity of water is dispensed by lowering the water within a container between two levels associated with the amount. In the second technique, the hot water is dispensed into the brew basket at a uniform rate by maintaining a preselected pressure level in the hot water tank, and then the brew valve is opened open for a for a total preselected time period corresponding to the desired amount of hot water to be added.

SUMMARY OF THE INVENTION

It is therefore an object of the present invention to provide a beverage making system that variously overcomes the disadvantages of the prior art brewing systems noted above by one or more of the concepts of using a flow meter to measure the quantities, using a siphon connection to pass the hot water to the brew basket, and enabling selective variation of the total and relative amounts of hot brew water and cold diluent water and the total amount of beverage being made.

This objective is achieved in part by providing in a beverage brewing system connectable with source of water and having a brew basket for holding extract ingredient, and a mixing chamber for receipt of both liquid drink extract and a quantity of diluent water for mixing together into a beverage, with a control system, having a flow meter, a controllable delivery system for delivering a quantity of water from the source to the brew basket to make the liquid drink extract and to the mixing chamber, and a controller responsive to the flow meter for selectively controlling the delivery system to deliver only a preselected amount of water to at least one of the brew basket and to the mixing chamber.

Preferably the delivery system includes a controlled mixing valve for passing water from the source and the flow meter to the mixing chamber, and the controller includes means responsive to the flow meter for temporarily storing the actual quantity of water passed through the controlled mixing valve. The delivery system also preferably includes a controlled brew valve for passing water from the source and the flow meter to the brew basket, and the controller includes means responsive to the flow meter for at least temporarily storing the actual quantity of water passed through the controlled brew valve.

Achieving another advantageous feature, the brewing system is preferably provided with a brew water tank, and a siphon connection between the brew water tank and the brew basket, and the controlled brew valve passes water to the brew water tank to force an equal quantity of water in the brew water tank to pass to the brew basket through the siphon connection between the brew water tank and the brew basket. The brew water tank is provided with a level sensor in the brew water tank for sensing when the brew water tank is at a preselected siphon level above which water is siphoned off through the siphon connection to the brew basket, and a heating element for heating the brew water in the brew water tank before it is siphoned off to the brew basket.

The controller controls the valves to prevent both from being open at the same time and includes means for storing an output indication of quantity from the flow meter as brew water when the one of the valves connected to the brew water tank is opened and the other one of the valves is closed, and means for storing an output indication of quantity from the flow meter as mixing water when the other one of the valves connected to the mixing chamber is open and the one valve connected to the brew water tank is closed.

Preselected total quantities of brew water, of mixing water, of the total accumulative amount of water and the ratio of brew water to the mixing water are stored in memory and compared to the actual amounts of water passing through the brew valve and the diluent valve, and when the actual amounts equal the preselected total amounts the appropriate valves are closed. The measurement of the quantities passing through the valves is substantially independent of water pressure or flow rate, and thus the system works consistently despite varying water pressures, and, advantageously the use of a pressure regulator is eliminated.

The preselected total quantities or ratio may be changed to accommodate different conditions of strength, type and quantity of tea, etc.

The object of the invention is also achieved in a beverage brewing system connectable with a source of water and having a brew basket for holding extract ingredient and a mixing chamber for receipt of both the liquid drink extract and a quantity of diluent water for mixing together into a beverage, by providing beverage brewing control method comprising the steps of measuring the quantity of water flowing from the source of water with a flow meter, and delivering through a delivery system water from the source to the brew basket to make the liquid extract and to the mixing chamber, and selectively controlling, with a controller responsive to the flow meter, the delivery system to deliver only a preselected amount of the measured quantity to at least one of the brew basket and to the mixing chamber.

More generally, the objective of the invention is achieved by providing a control system in a beverage brewer comprising the combination of means for measuring with a flow meter a quantity of water being passed to the brewer from an external source of water, and means for controlling a water distribution system of the brewer in response to the measuring means.

Preferably, the flow meter is a paddle-wheel type flow meter with one of an electrical and a magnetic output representative of the revolutions per minute of the paddle-wheel.

In one embodiment of the invention, only a single flow meter is used to measure both brew water and diluent water, but in another form of the invention two separate flow meters are used. In this other embodiment, the controlling means includes a computer responsive to one of the flow meters for controlling the operation of one of the valves and is responsive to another one of the flow meters for controlling the other one of the valves. While an additional valve and control connections for the additional valve are required, both of the valve may be opened at the same time rather than only one at a time as in the single flow meter embodiment, and thus relative throughput rates may be increased by opening both at the same time.

Thus, the brewing control method of the invention in a hot beverage brewer comprises the steps of measuring a quantity of water being passed to the brewer from an external source of water, and controlling a water distribution system of the brewer in response to the measuring means.

BRIEF DESCRIPTION OF THE DRAWINGS

The foregoing advantageous features will be explained in detail and other advantageous features will be made apparent in the following detailed description of an embodiment of an iced tea brewing system of the present invention that is given with reference to the several figures of the drawing, in which.

DETAILED DESCRIPTION

Figure 1:
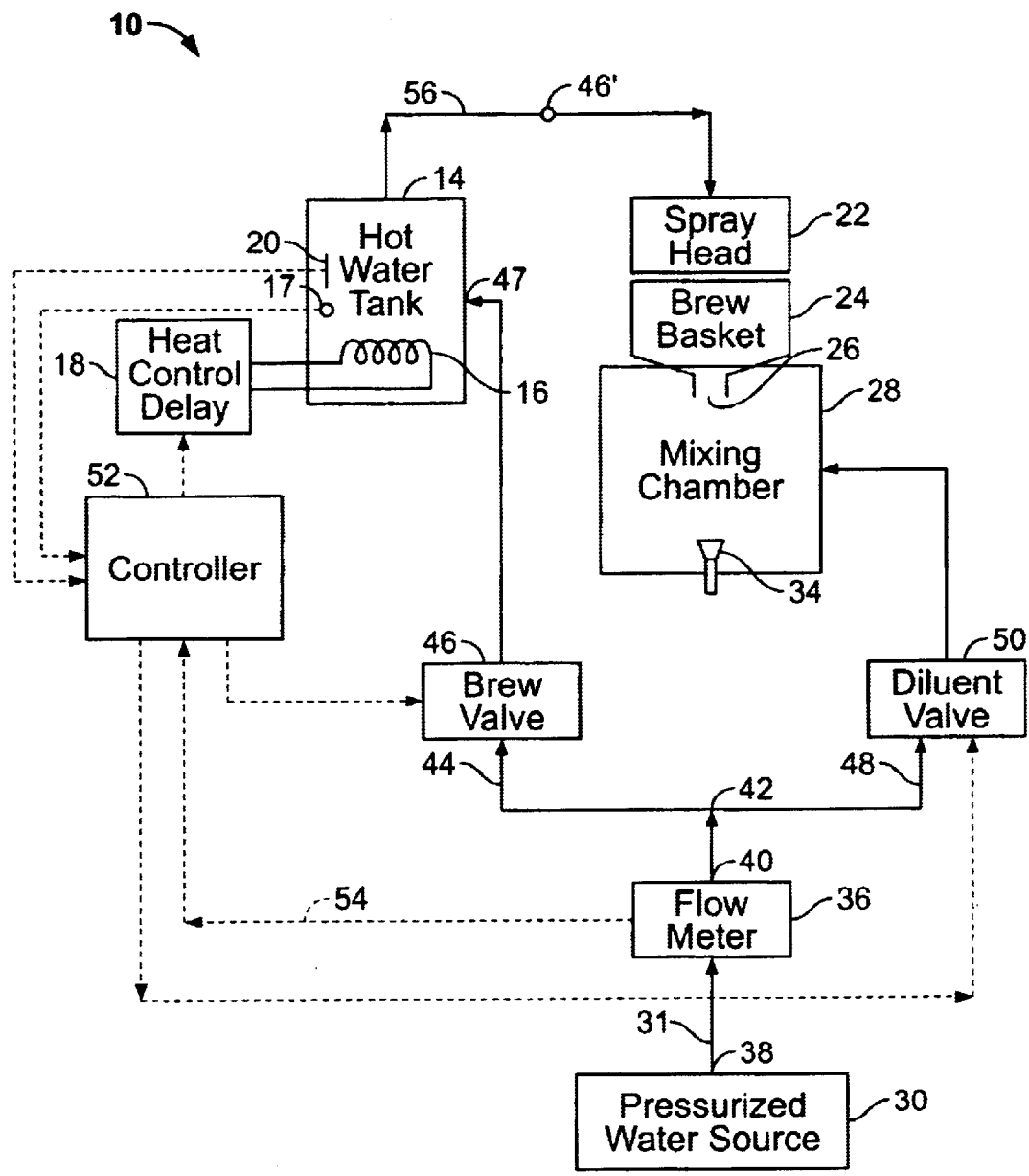
FIG. 1 is a schematic functional block diagram of an iced tea brewing system that incorporates the advantageous features of the invention.

Referring to FIG. 1, the flow meter responsive brew system 10 of the present invention is seen to include some of the conventional elements of known tea brewing systems including a hot water tank 14 for storing the hot water that is used for brewing the tea, an electrical heating element 16 for heating hot water in the hot water tank 14, a temperature sensor 17 for sensing the temperature of the hot water in the hot water tank 14, a heat control relay 18 for controlling the application of electrical power to the electrical heating element 16 and a level sensor 20 for detecting the level of hot water in the hot water tank 14. Also, included is a dispenser assembly, or spray head, 22 for passing the hot water from the hot water tank 14 to a brew basket 24.

During normal operation of the brewing system 10, the brew basket is first loaded with a known quantity of dry tea ingredient. Preferably, the tea is contained in one or more prepackaged envelopes made of filter paper. Alternatively, dry tea leaves are contained within an open, cup-shaped filter paper that is supported within the brew basket. This tea is then brewed by the passage of the hot water from the spray head 22 seeping through the tea contained in the envelope or loose within the brew basket 24 to form a liquid tea extract. The number of ounces of tea used to make a given quantity of tea extract depends upon the type of tea and the desired strength of the abstract and of the final beverage.

The brewed hot liquid tea extract from the brew basket 24 passes out of the brew basket 24 though an outlet 26 at the bottom of the brew basket 24 and into a removable mixing chamber 28 which also preferably functions as an insulated, mobile serving urn. The hot tea extract is mixed with water obtained from a suitable pressurized, water source 30, such as provided by the local water company at a standard manually operated valve fixture with a screw-on hose connector. A suitable hose connects the pressurized water source to the brewer system 10.

In known brewing systems, the water pressure of the water source must be regulated because control of the amount of mixing water that is passed to the mixing chamber 28 is performed by timing the length of time that a mixing valve between the mixing chamber 28 and the pressurized water source is kept open. The amount of water that passes through the valves for a given time period is dependent upon the flow rate, and the flow rate is dependent upon the pressure of the water of the pressurized water source. Accordingly, in the known tea making system, a pressure regulator must be provided in-line with the relatively unregulated pressurized water source and the control valves.

In the present invention, as will be explained in detail below, the actual amounts, or quantities of water passed to the mixing chamber 28 and directly to the brew basket 24 are measured independently of flow rate, and no pressure regulator is required for accurate measurement of the amount of water being passed to the brew basket 24 and the mixing chamber 28. Consequently, the pressure of the water source 30 may vary between five pounds per square inch or less to one hundred pounds per square inch or more without significantly adversely affecting accuracy of water quantity measurement.

After the tea extract has been mixed with the cold water in the mixing chamber, or removable serving urn, 28 it may be removed from beneath the brew basket 24 and replaced with another like serving urn that is empty to commence another brew cycle to make another batch of iced tea. The removed urn is then put on a cart or the like and moved to another serving location where tea is served from a spigot 34 at the bottom of the mixing chamber 28. Alternatively, the mixing chamber is left in place, and the mixing chamber 28 is emptied of ice tea before another batch is made.

In known iced tea systems, both the ratio of the amount of extract to the amount of diluant and the total amount of tea being made per batch is fixed and may not be changed for varying conditions, such as for different quantities, qualities, types or strengths of tea in the brew basket. In accordance with the present invention, this disadvantage is overcome. Both the total amount of iced tea and the ratio of cold extract to hot tea extract are separately controlled and may be varied as desired within operating ranges. This is achieved by means of several elements that work in cooperation with one another.

First, the total amount of water that is passed to either the hot water tank for heating or directly to the mixing chamber 28 for mixing is measured by a flow meter 36. The flow meter has an input connected to the output 38 of the pressurized cold-water source 30 and measures all of the water that passes from the pressurized water tank 30 and the brewing system 10. As noted, this measurement eliminates the need to provide a pressure regulator. Preferably, flow meter is a Hall effect, paddle-wheel type of flow meter with a magnetic output. The magnetic output signal provides an indication of each full, or partial revolution of the paddle-wheel. For each full, or partial revolution of the paddle-wheel, a known quantity of water is passed from the inlet of the flow meter 36 to the outlet 40 of the flow meter 36. By counting the number of revolutions, or part revolutions, of the paddle-wheel, the total quantity of water that is passed through the flow meter 36 is measured. With use of a good commercially available flow meter, it is believed that even with a line pressure variation of between five and one hundred pounds per square inch, there will be a maximum 1% variation in measurement.

Preferably, only a single flow meter 36 is employed with its outlet 40 connected to a T-junction 42. One branch of the T-junction is connected to an inlet 44 of a solenoid controlled valve, or other electronically controlled valve, 46, which is referred to a the brew valve 46 but which also, functions to fill the tank while simultaneously forcing water out of the tank and into the spray head 22. The other branch of the T-junction is connected to an inlet 48 of another solenoid controlled, diluent valve, or other electronically controlled valve, 50 which functions to pass water directly from the flow meter 36 to the mixing chamber 28. The outlet of the brew valve 46 is connected to an inlet 47 at the side of the hot water tank 20 adjacent the bottom of the hot water tank 20. The outlet of the diluent valve 50 is connected to an inlet 51 of the mixing chamber 28 adjacent the top of the mixing chamber 28. When the brew valve 46 is open and the diluent valve 50 is closed, measurements of quantity of water passing through the flow meter 36 are measurements of brew water being passed to the spray head 22 and the brew basket 24. Conversely, when the brew valve 46 is closed and the diluent valve 50 is open, then measurements of water passing through the flow meter 36 are measurements of mixing water being added to the mixing chamber.

A controller 52 controls the operation of the solenoid-controlled brew valve 46 and the solenoid-controlled diluent valve 50 via signals on control lines 54 and 56, respectively. The controller 52 receives an electrical input signal from the flow meter 36 representative of the amount of total flow of cold water from the pressurized cold-water source 30 on a signal line 54. In addition, the controller 52 receives electrical input signals from the level sensor 20 and the temperature sensor 17 in the hot water tank 20.

In keeping with an important aspect of the invention, the flow of hot water from the hot water tank 14 to the spray head 22 is preferably via an open siphon connection 56 that does not pass through a valve. Advantageously, this open siphon connection 56 eliminates the use of a brew valve on the hot water side of the hot water tank 14 and thereby eliminates the liming problem associated with hot water valves in general.

In addition, steam emanating from the top surface of the hot water in the hot water tank 20 passes freely through the siphon connection 56 and thereby automatically periodically and automatically cleans the siphon connection during regular use. Thus, while the brew valve 46 could be located at the hot water outlet of the hot water tank 14 at location 46' with a valve or valve-less connection between the flow meter 36 and the inlet 47 of the hot water tank 14 without interfering with the control function of the brew valve 46, the brew valve 46 is preferably located at the relatively cold water inlet side to avoid liming problems that develop with passing hot water through the valves.

In the known brewing systems, two valves are used in association with the hot water tank: one at the cold water inlet to fill the hot water tank with a preselected quantity and another one at the hot water outlet and subject to liming problems to drain the hot water tank of this quantity. This created a problem in addition to the requirement of two valves instead of only one. Because the tank would be depleted during a dispense period when the hot water was being drained from the hot water tank and passed to the spray head, the head pressure would become less and less as the tank was drained. Consequently, the drain rate would become slower and slower until very near the end it was reduced to a trickle. This resulted in a prolonged and nonlinear dispense period with a long period of dripping of tea extract from the brew basket after the end of the dispense period. In addition, since not water was added to the hot water tank during the dispense period, after the end of the dispense period, another brew cycle could not be commenced until the tank was refilled and then heated to the preselected relatively hot temperature, such as two hundred or two hundred five degrees Fahrenheit.

In accordance with the present invention, the to controller 52 controls the brew valve 46 in response to the level sensor 20 to keep the hot water tank 14 filled at all times. Until the hot water 14 tank is filled, as indicated by the level sensor 20, and the temperature is above a preselected temperature, as indicated by the temperature sensor 17, a new brew cycle cannot begin. When the controller 52 receives a signal indicating that the level is beneath a preselected level, it automatically actuates the solenoid controlled brew valve 46 to open and remain open until the preselected level is reached. Likewise, until the preselected temperature is reached, the controller 52 actuates the heat control relay 18 to energize the heating element 16.

Figure 3:
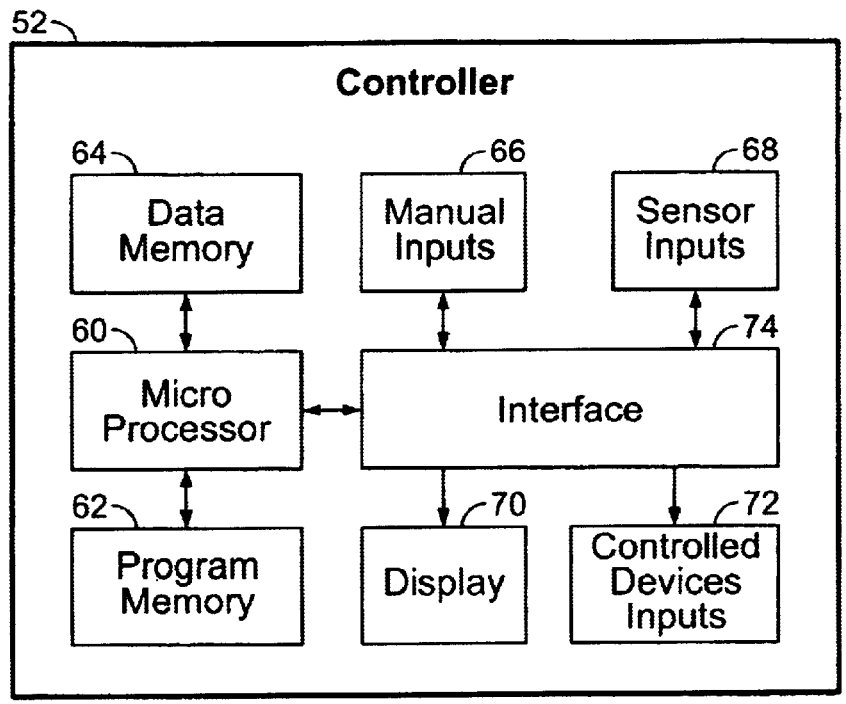
FIG. 3 is a schematic functional block diagram of the controller of FIG. 1.

During a brew cycle, in accordance with the invention, the controller 52 also controls the controlled brew valve 46 to open in response to manual actuation of a start brew switch of the manual inputs 66, FIG. 3, to the controller 52 and then to close automatically when the flow meter 36 indicates that the preselected quantity of cold water has passed into the hot water tank 14. Because the hot water tank 14 is first filled before the start of the first brew cycle, each quantity of cold water added through the inlet 47 to the bottom of the hot water tank 14 results in an equal quantity of hot water exiting from the top of the hot water tank 14 through the siphon connection 56 and into the top of the spray head 22 and then to the brew basket 24 to make the hot tea extract. Thus, the one brew valve 46 simultaneously controls both the inflow of cold water in to the hot water tank and the outflow of hot water from the hot water tank 14.

This flow of cold water may be continuous, but preferably is intermittent in accordance with the teachings of co-pending patent application Ser. No. 09/438,094, of Zbigniew G. Lassota, present co-inventor, filed Nov. 10, 2000, and entitled "Oxygenating Tea Maker and Method", which is hereby incorporated by reference, and as explained below. When a preselected quantity of cold water has passed into the full hot water tank 14 to make a desired preselected quantity of extract, as indicated by the flow meter 36, then the controller 52 automatically closes the brew valve 46.

If the flow for producing the extract is continuous, then the diluent valve is kept closed continuously throughout the time period that hot water is being passed through the siphon connection 56 and into the top of the spray head 22 and then onto the top of a layer of tea within the brew basket 24. In such case, the diluent valve 50 is not opened by the controller 52 until all of the hot water for the tea extract has passed out of the hot water tank and the brew valve 46 has been closed. The mixing valve 50 is then opened and kept open until a preselected quantity of diluent has passed through the flow meter 36 and the diluent valve 50 and into the mixing chamber 28. When this preselected quantity has passed, as indicated to the controller 52 by the flow meter 36, the controller 52 automatically closes the diluent valve 50, and the diluent valve 50 remains closed until the next brew cycle. This continuous mode of operation is illustrated by the comparative timing diagram of FIG. 4.

If the brew valve 46 is controlled to operate in an intermittent mode of operation, with the brew valve intermittently opening and closing for purposes of prewetting and aerating the tea during the dispense period of the brew cycle, as described in patent application note above, then it is possible to intermittently open the diluent valve 50 during the intermittent periods that the brew valve 46 is closed.

Presuming that not all of the diluent required can be added during the intermittent time periods when the brew valve 46 is closed, at the end of the brew period, the diluent valve is opened continuously and kept open until the total preselected quantity of diluent has been added to the mixing chamber 28. The total elapsed time to add the remaining quantity of diluent is reduced proportionately by the amount that has already been added during the intermittent periods that the diluent valve 50 was opened during the dispense period. This intermittent mode of operation is illustrated by the comparative timing diagram of FIG. 5.

Figure 2:
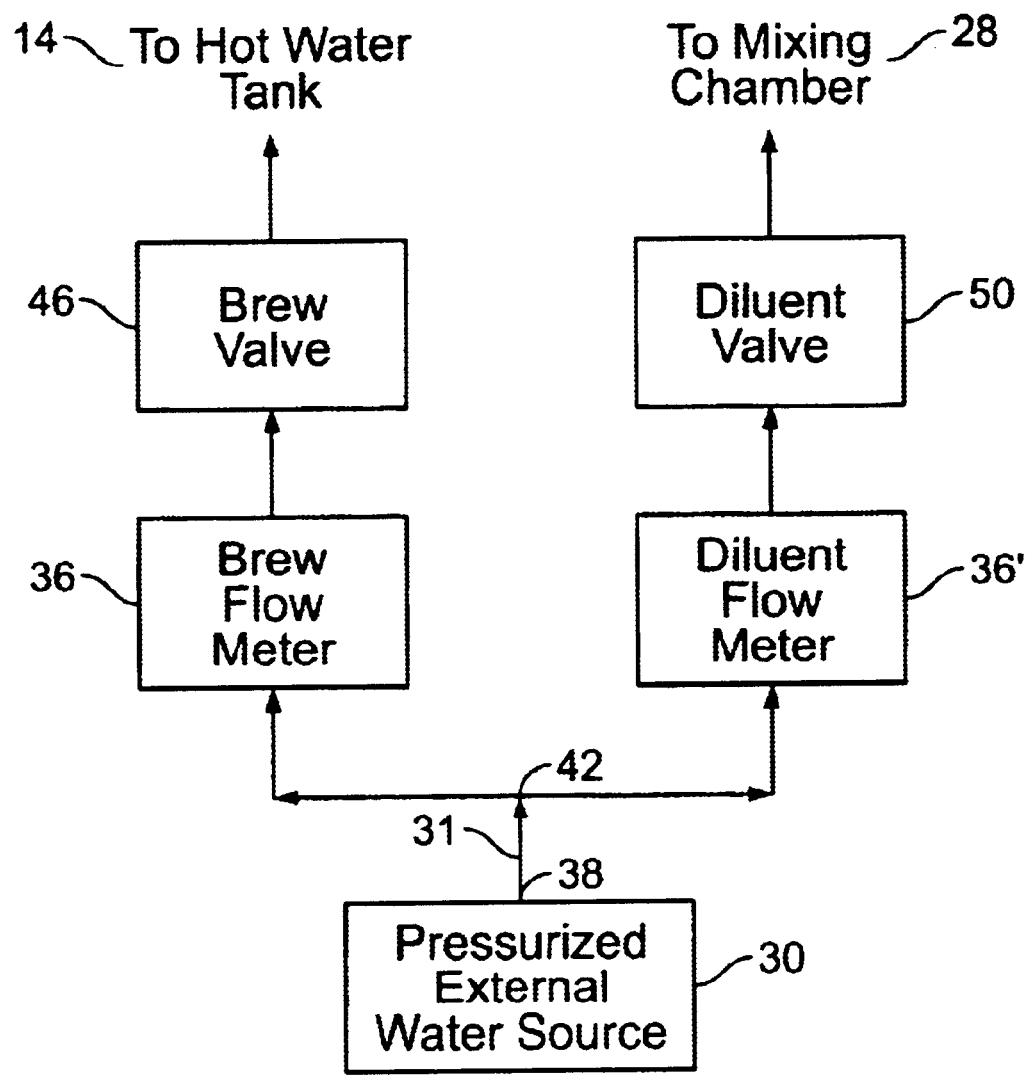
FIG. 2 is a schematic functional block diagram of an alternative form of a portion of the brewing system of FIG. 1.

Referring now to FIG. 2, an alternative form of a portion of the beverage brewing system 10 is shown in which another flow meter, a diluent flow meter 36' has been added in line between the water source 30 and the diluent valve 50 to measure only the flow through the diluent valve 50. Similarly, the first flow meter 36 has been reconnected so that it is only inline with brew valve 46 to measure only the flow through the brew valve 46. In this form of the invention, because the flow through each of the valves 46 and 50 may be measured independently both the valves 46 and 50 may be opened simultaneously. The flow through both of the valves 46 and 50 is measured simultaneously by the brew flow meter 36 and the diluent flow meter 36', respectively, and the measurements are simultaneously sent to the controller via lines 37 and 39.

Figure 6:
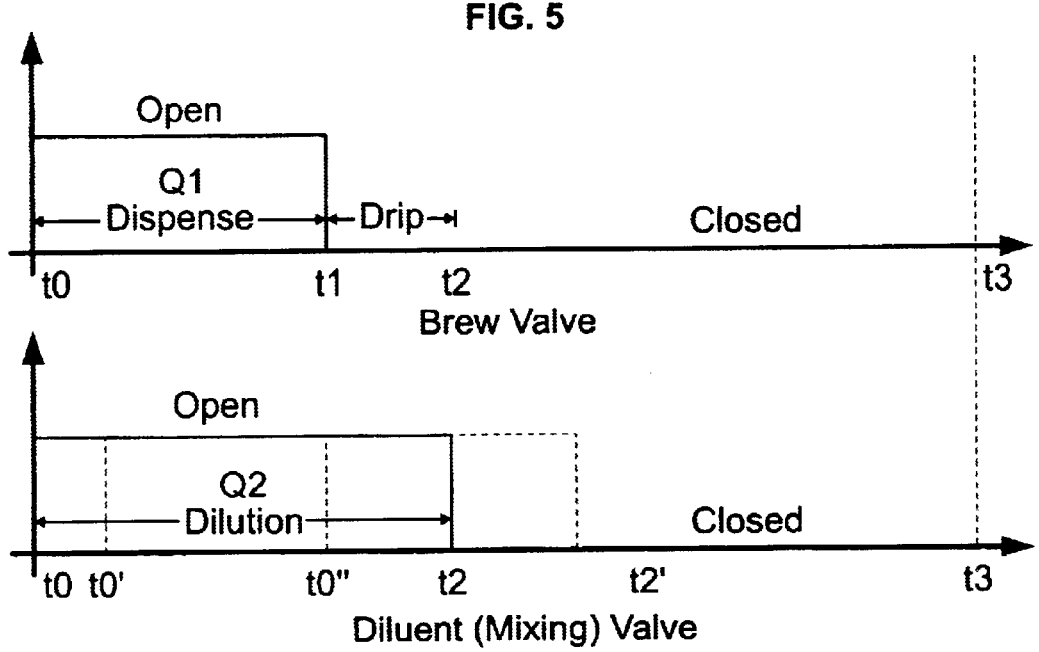
FIG. 6 is a comparative timing chart illustrating control of the controlled valves of FIG. 2 when the system is operated in either intermittent flow mode or continuous flow mode.

Accordingly, the operation illustrated in FIG. 6 of the valve may be employed in which the dilution water may be added during all or a portion of the dispense period starting at time t0'. Accordingly, it may be possible to end the brew cycle earlier at time t2' or even earlier at time t2 coinciding with the end of the drip period at time t2 for a reduced brew cycle time and a faster throughput for the system. However, because an additional flow meter is required, this form is not necessarily preferred over the single flow meter form of the invention shown in FIG. 1.

In either event, because after start-up the hot water tank is kept filled during the brew period and thereafter, there is no waiting time between brew cycles while the hot water tank 14 has to be filled back to level and heated to the correct temperature.

While the addition of the flow meter 36 is required by the invention, the brew valve 46 performs a dual function of both filling the hot water tank 14 with fresh water from the pressurized external water source 30 and controlling the passage of the hot water to the spray head 22. In prior devices, two separate valves were required: a fill valve at an inlet for filling the hot water tank and a separate brew valve at the outlet end of the hot water tank for passing hot water to the spray head 22 by means of gravity. As previously noted, a problem with the use in known tea making systems of a brew valve at the outlet end of the hot water tank is that water passing through the brew valve is hot water and consequently the outlet brew valve is subject; to liming and resultant interference with the moving parts of the valve.

Referring now to FIG. 3, the controller 52 is seen to include a microprocessor 60 with an associated program memory 62 and a data memory 64. Within the program memory 62 are stored the software programs of FIGS. 7, 8 and 9 and the preselected programmable parameters such as the preselected temperature, the total quantity of tea to be made and the ratio of extract to diluent or amount of extract or of diluent that have been selected, all as described in detail below. In the data memory 64 is stored the changing data received from the temperature sensor 17, the level sensor 20, the flow meter 36, or flow meter 36' or both, and temporary manual inputs such as actuation of the start brew switch of the manual inputs 66. The microprocessor 60 interfaces with manual inputs 66 such as a start brew switch and a emergency off switch, sensor inputs 68, an alpha numeric display and light indicators 70 and controlled devices 72 through a suitable interface 74.

The manual inputs include a start brew switch, an emergency stop switch and a keyboard input to enter programmable parameters into the controller 10. The sensor inputs include inputs from the flow meter 36, or in the case of the system of FIG. 2, both of the flow meters 36 and 36', the temperature sensor 17 and the level sensor 20. Sensors may also be provided for sensing the states of the valves. The controlled devices inputs include the heat control relay 18, the brew valve 46, and the diluent valve 50. The display 70 is preferably a liquid crystal display for displaying messages in alphanumeric form.

Figure 4:
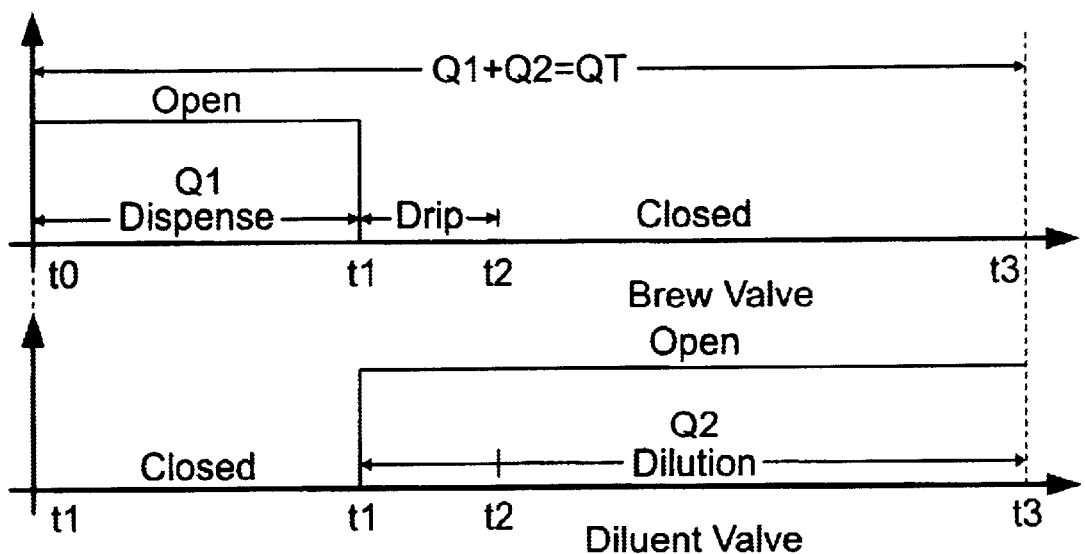
FIG. 4 is a timing chart illustrating control of the controlled valves of FIG. 1 when the brewing system is operated in a continuous flow mode.
Figure 5:
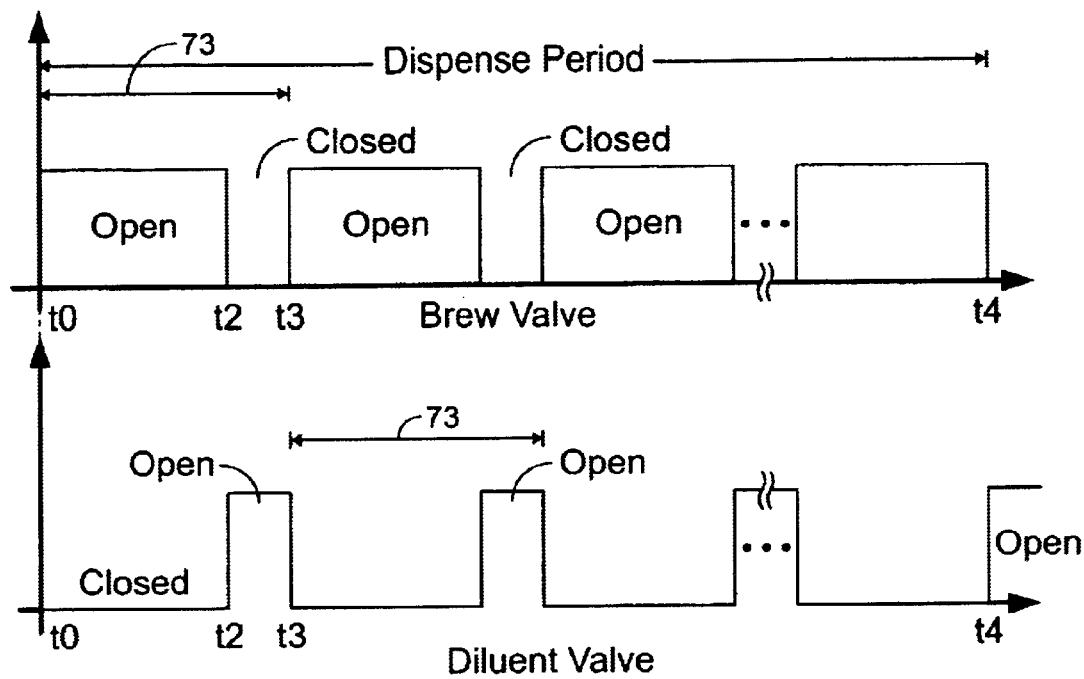
FIG. 5 is a timing chart illustrating control of the controlled valves of FIG. 1 when the brewing system is operated in an intermittent flow mode.

In the embodiment of FIG. 1, the brew valve 46 and the diluent valve 50 are operated in alternate phase. When one is open the other is closed. When the microprocessor opens the brew valve 46, it simultaneously closes the diluent valve 50, and vice versa as illustrated in FIGS. 4 and 5. When the brew valve is open, the input from the flow meter is input to the microprocessor 60 as measured extract fluid quantity and stored as measured extract quantity, or actual amount. On the other hand, when the brew valve is closed and the diluent valve is open, then the quantity measured by the flow meter and sent to the microprocessor 60 is added to memory as added diluent. In the embodiment of FIG. 2, on the other hand, both valves may be open simultaneously as illustrated in FIG. 6.

In the case of the single flow meter embodiment of FIG. 1, the brew cycle composes three elements: the dispense period during which the brew valve is opened either continuously, as illustrated in FIG. 3, or intermittently, as illustrated in FIG. 4, from time t0 through time t1; followed by a drip period from time t1 trough time t2 during which the water added at the end of the dispense period remains seeping through the tea ingredient and finally exits through the outlet drain hole 26 of the brew basket 24 and into the mixing chamber 28; and then ending with the diluant period. During the diluant period the preslected quantity Q2 of cold water diluent is added to the mixing chamber 28 from time t1 through time t3. The total amount of water Qt is the sum of the hot brew water Q1 dispensed when the brew valve 46 is open and the diluent valve open plus the amount of diluent Q2 added when the diluent valve 50 is open and the brew valve 46 is closed.

Advantageously, the drip period ends on or before the, end of the dilution period at time t3, when the dilution valve closes. At this time the brew basket may be removed and new ingredient added for the next brew cycle, such that as soon as the diluent period is completed, a new brew cycle can be started without have to wait for the end of a drip period as was required in the known iced tea brewing system or changing of the brew basket. In the present invention, because the head pressure is kept at a high level by filling the tank contemporaneously with the hot water being taken out of the tank, the flow rate out of the hot water tank at the end of the dispense period is just as fast as the flow rate at the beginning of the dispense period, and the duration of the drip period is significantly and advantageously shortened.

On the other hand in the known iced tea brewing system, the hot water tank would not be replenished until after the level had been reduced to zero. Consequently, the head pressure in the hot water tank would gradually be reduced to zero at the end of the dispense time period such that the flow rate would also gradually be reduced to zero, resulting in a very long drip period that would extend beyond the end of the duluent period. Thus, in the known system it was necessary to wait the end of the slow drip period before a new brew cycle could be commenced and the through put of the system was reduced.

Turning now to FIG. 4, as taught in the aforementioned patent application, preferably the hot water is added to the tea ingredient on an intermittent basis over the course of the dispense period. In such case the dispense period is composed of a plurality of intermittent, periodic, dispense cycle periods, or intermittent periods 73. Each intermittent period is composed of a time when the brew valve is open, such as described in greater detail in the aforementioned patent application. Reference may also be made to U.S. Pat. No. 6,148,717 issued Nov. 21, 2000, to one of the present inventors, which is hereby incorporated by reference. For example, the valve may be kept open for a period of 10–20 seconds followed by a time period that the valve is closed, such as 20–10 second for a total pulse period of approximately 30 seconds. The percentage of the open time compared to the total intermittent period 73 is the duty cycle. For a given quantity Q1 of hot water, the decreases in the duty cycle result in increases in the dispense period.

In the event of intermittent operation, during the times that the brew valve is intermittently closed, in keeping with one aspect of the invention, the diluent valve is opened in order to start adding diluent to the mixing chamber before the end of the dispense period. Then at the end of the dispense period and start of the diluent period at time t1, the diluent valve is kept open continuously until the total preselected quantity of diluent has been added. In this way the diluent period may be shorted proportionately by the amount delivered during the intermittent off periods of the brew valve 46 during the dispense period for an faster total brew cycle duration and better throughput, as illustrated in FIG. 5.

In the case of the embodiment of FIG. 2, the brew cycle period may be even shortened further by opening both valve simultaneously as shown in FIG. 6. During the dispense time period shown in FIG. 6, the brew valve 46 may be operated on an intermittent basis as shown in FIG. 5.

Figure 7:
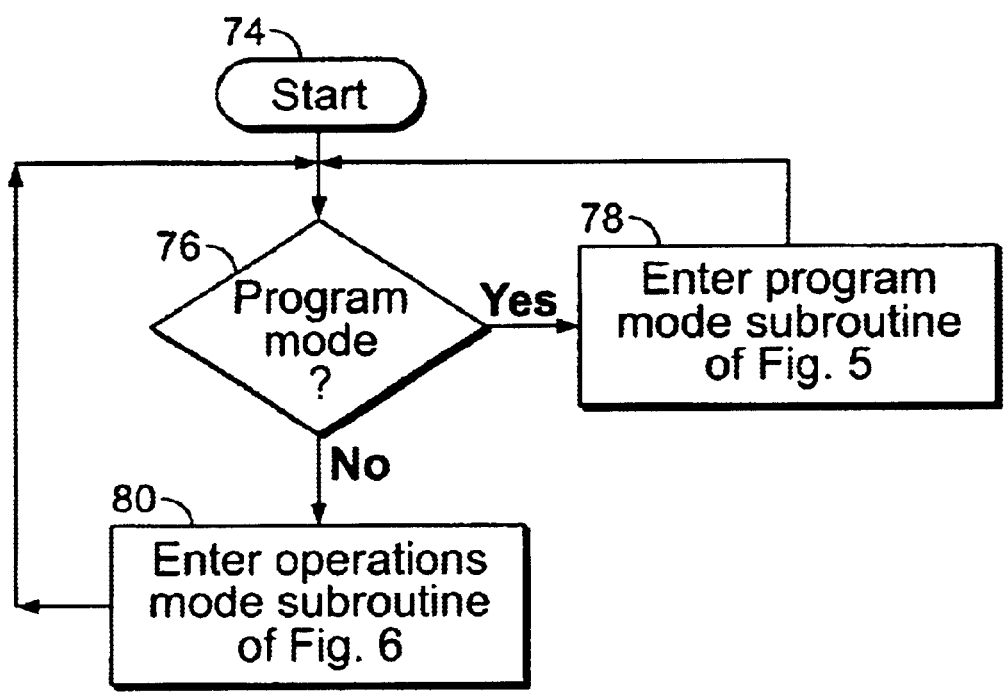
FIG. 7 is a flow chart of the main computer program stored in the program memory of the controller of FIG. 3.

The controller operates in accordance with the main software program of FIG. 7. After start 74, a determination is made in step 76 whether a program mode has been selected. If the program mode has been selected, then in the next step 78, the controller enters into the program mode subroutine of FIG. 8. If not, then in step 80 the controller 52 enters the operations mode subroutine of FIG. 9. The controller then recycles by returning to step 76.

Figure 8:
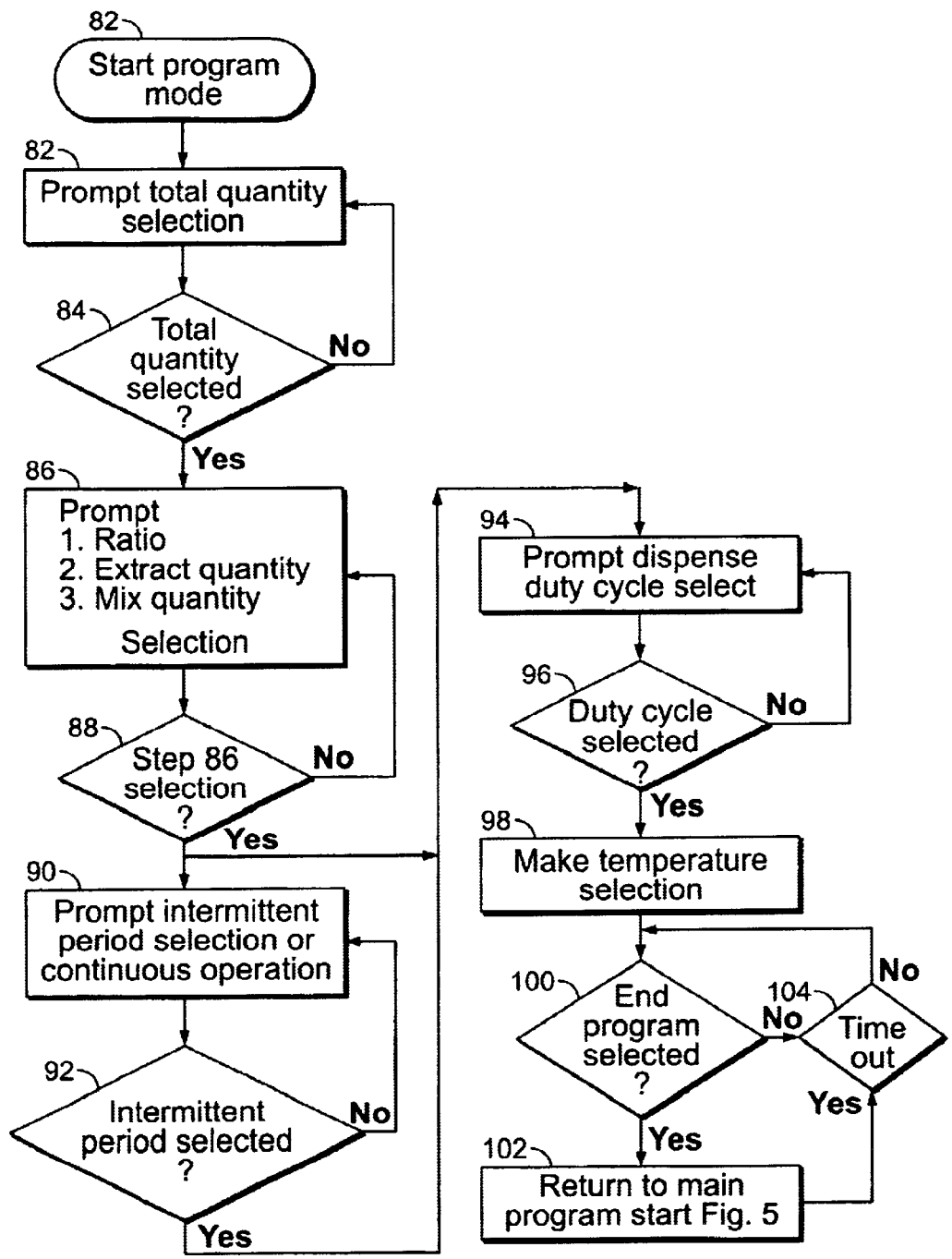
FIG. 8 is a detailed flow chart of the program mode subroutine of the computer program of FIG. 7.

Referring to FIG. 8, after start 82 of the program if mode, in step 83 the user is prompted with a message on the display 70, FIG. 3, to select the total quantity Qt of tea to be made. For instance, one of 3.0, 3.5 and 4.0 gallons may be selected. Once it is determined that a selection has been made in step 84, the computer in step 86 then provides a prompt for the user to select the ration of extract to diluent, such as one of 2:1, 2.5:1 and 3:1; the amount of extract quantity, such as 0.5, 0.75 or 1.0 gallons; or the amount of mixing quantity such as 2.0, 2.5 or 3.0 gallons.

Once it is determined in step 88 that a ratio, extract quantity or mixing quantity has been selected, in step 90 the user is given a prompt to select an intermittent period (the time period between t0 and t3 of FIG. 5), such as ten seconds, twenty seconds or thirty seconds, or to select continuous flow. After it is determined in step 92 that an intermittent period or continuous flow has been selected, then in step 94 a prompt is provided to select the dispense duty cycle. For continuous flow, the duty cycle is 100%. The intermittent selections may provide duty cycle selections of 40%, 50% and 60%, for example.

After the duty cycle has been selected, as determined in step 96, in step 98, the user is prompted to select a temperature at which the hot water in the hot water tank 14 is to be maintained, such as 195, 200 and 205 degrees Fahrenheit. After the temperature is selected, a determination is made in step 100, if the user has elected to end the program mode. If so, the program returns to the main program start 74, FIG. 5, in step 102, and if not, after a preselected time has passed without input from the user, in step 104, the program moves to step 102 and thus back to the main program and the operations mode, described below. There are also of course other time out loops at each of the above steps of the program that will return the computer to the operations mode if no action is taken for a time-out period.

Figure 9:
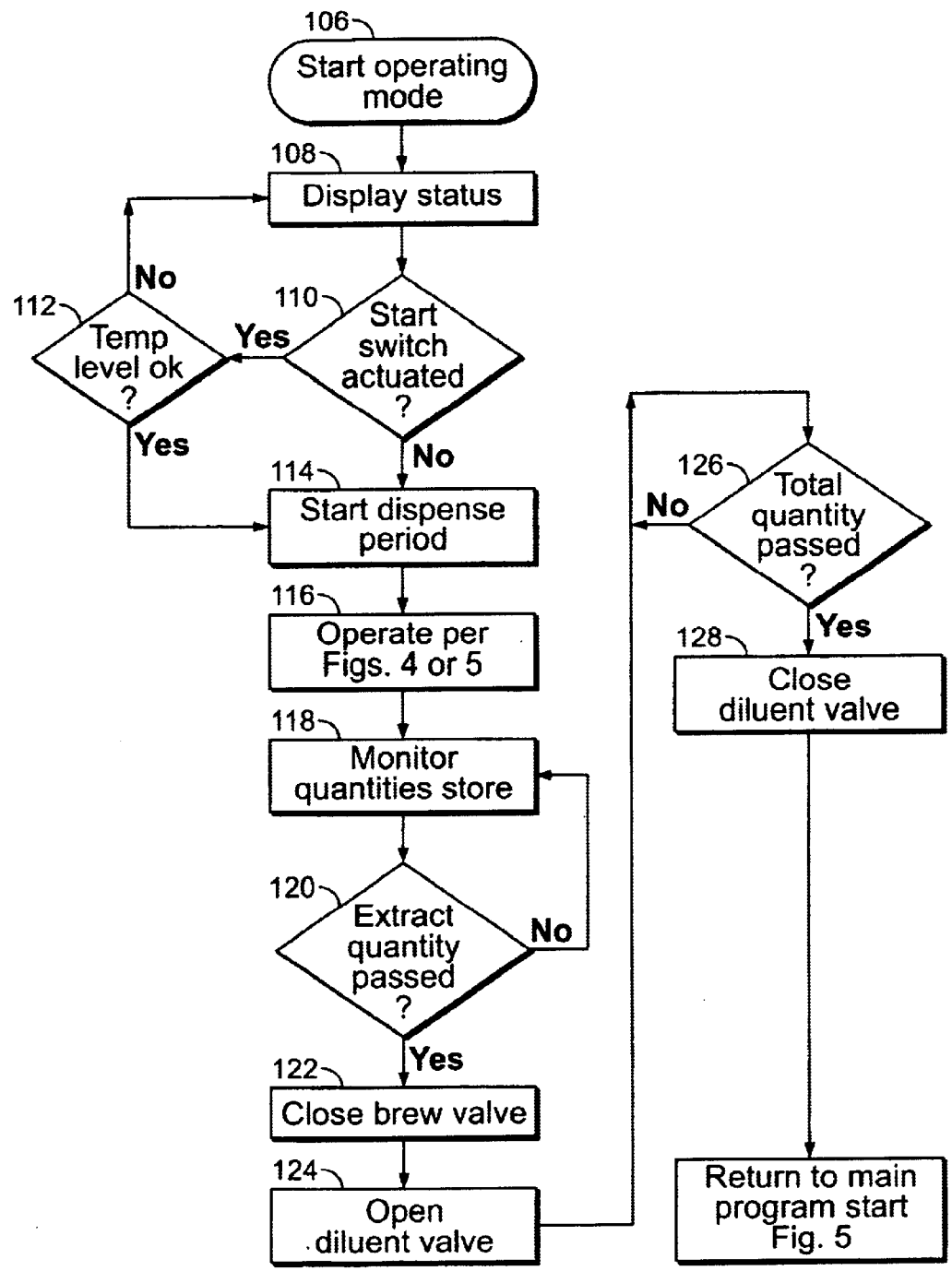
FIG. 9 is a detailed flow chart of the operating mode subroutine of the computer program of FIG. 7.

Referring to FIG. 9, after the start 106 of the operations, or operating, mode, the status of operations is displayed in step 108. In step 110, a determination is made whether a start brew switch has been actuated. If so, then in step 112, a determination is made whether the water temperature and level are at the preselected minimum levels required for commencement of a brew cycle. If not, then this information is displayed in step 108 and the program recycles until the temperature and the level are at the preselected levels. When everything is "ok" for starting a brew cycle, in step 114, the dispense period is begun. Then in step 116, depending upon what user programmable parameters have been selected in the programming mode, the brewer operates in accordance with either FIG. 4 or FIG. 5, or in the case of the embodiment of FIG. 2, in accordance with FIG. 6, either with continuous flow, as shown in FIG. 6, or with intermittent flow of hot brew water, as shown in FIG. 5 except with continuous flow of the diluent. The quantities of brew water and diluent water that are passed by the flow meter 36 are monitored and stored in the data memory in step 118.

When the preselected quantity of brew water, or extract, has been measured, as determined in step 120, then; in step 122 the brew valve 46 is closed for the remainder of the brew cycle and no more water is passed to the hot water tank 14. At the same time, in step 124, the diluent valve 50 is opened to pass cold water to the mixing chamber 28 during periods when the brew valve 46 is closed, or in the embodiment of FIG. 2, continuously from the start and even when the brew valve 46 is open. In step 126, when it is determined that the preselected total quantity Qt has been passed by the flow meter 36, or by both flow meters 36 and 36', then in step 128 the diluent valve 46 is closed and the brew cycle is completed. The program then returns to the start 74 of the main program.

While a particular embodiment of the iced tea brewing system has been disclosed in detail, it should be appreciated that many obvious variations may be made without departing from the scope of the invention as defined in the appended claims. For instance, although one aspect of the invention is the ability to selectively change the ratio between brew water and mixing water, the advantages of using one or more flow meters to measure the amount of water that is passing to the brewer and the elimination of a hot water valve are retained regardless of whether the ratio or total amount of beverage or amount of dispense water or brew water or amount of mixing water can be changed and vice versa. The total amount may be changed without the ability of changing the ratio. Also, while the controlled valve that are employed are either open or closed, valves that are capable of operating in an analog fashion, i.e. that can change flow rate by changing passage diameter through the diameter. In such case, for instance, it may be possible to operate with only a single analog valve and a single flow meter. The invention contemplates all of these alternatives and others as well as defined in the appended claims. Further, while the brewer system of the invention that has been described in detail is one embodiment in which iced tea is made, it should be appreciated that the concepts disclose and claimed here can be used to brew any drinks, hot or cold, in which there is an abstract production stage and a mixing of the abstract with a diluent stage in the production of the final beverage. This could be a coffee, tea or any other ingredient, dry or wet, capable of being mixed with water or other diluent in order to be able to control the strength of the ultimate beverage that is produced, such as a drink made by mixing a fruit or other drink syrup with carbonated water or noncarbonated water.

What is claimed is:

1. In a beverage brewing system connectable with a source of water and having a brew basket for holding extract ingredient, and a mixing chamber for receipt of both liquid drink extract and a quantity of diluent water for mixing together into a beverage, the improvement being a control system, comprising:
   a controllable delivery system for selectively delivering water from the source to the brew basket to make the liquid drink extract and from the source to the mixing chamber for mixing with the drink extract;
   means for connecting the source of water to the controllable delivery system including a flow meter for directly measuring an actual quantity of water passing from the source to the delivery system substantially independently of the rate of flow of the water; and
   a controller responsive to the actual quantity water directly measured by the flow meter for selectively controlling the delivery system to deliver only a preselected amount of water to at least one of the brew basket and to the mixing chamber.

2. The beverage brewing system of claim 1 in which the delivery system includes a controlled mixing valve for passing water from the source and the flow meter to the mixing chamber, and
   the controller includes means responsive to the flow meter for temporarily storing the actual quantity of water passed through the controlled mixing valve.

3. The beverage brewing system of claim 2 in which the delivery system includes a controlled brew valve for passing water from the source and the flow meter to the brew basket, and
   the controller includes means responsive to the flow meter for at least temporarily storing the actual quantity of water passed through the controlled brew valve.

4. The beverage brewing system of claim 1 in which the delivery system includes a controlled brew valve for passing water from the source and the flow meter to the brew basket, and
   the controller includes means responsive to the flow meter for storing the quantity of water passed through the controlled brew valve.

5. The beverage brewing system of claim 4 including a brew water tank, and
   a siphon connection between the brew water tank and the brew basket, and in which
   a solenoid controlled brew valve passes water to the brew water tank to force an equal quantity of water in the brew water tank to pass to the brew basket through the siphon connection between the brew water tank and the brew basket.

6. The beverage brewing system of claim 4 including a brew water tank,
   a level sensor in the brew water tank for sensing when the brew water tank is at a preselected siphon level above which water is siphoned off through the siphon connection to the brew basket, and
   a heating element for heating the brew water in the brew water tank before it is siphoned off to the brew basket.

7. The beverage brewing system of claim 4 including a brew water tank with a side and a bottom, and in which
   the controlled brew valve is connected to the side of the brew water tank adjacent the bottom of the brew water tank, and
   the siphon connection is connected to the brew water tank adjacent the top of the brew water tank.

8. The beverage brewing system of claim 1 including in which
   the delivery system includes two controlled valves for respectively passing water from the source of water and flow meter to the brew basket and the mixing chamber, and
   said controller controls the valves to prevent both from being open at the same time.

9. In a beverage brewing system connectable with a source of water and having a brew basket for holding extract ingredient, and a mixing chamber for receipt of both liquid drink extract and a quantity of diluent water for mixing together into a beverage, the improvement being a control system, comprising:
   a flow meter;
   a controllable delivery system for delivering a quantity of water from the source to the brew basket to make the liquid drink extract and from the source to the mixing chamber for mixing with the drink extract including two controlled valves for respectively passing water from the source of water and flow meter to the brew basket and the mixing chamber; and
   a controller responsive to the flow meter for selectively controlling the delivery system to deliver only a preselected amount of water to at least one of the brew basket and to the mixing chamber, said controller controlling the valves to prevent both from being open at the same time and including
   means for storing an output indication of quantity from the flow meter as brew water when the one of the valves connected to the brew water tank is opened and the other one of the valves is closed, and
   means for storing an output indication of quantity from the flow meter as mixing water when the other one of the valves connected to the mixing chamber is open and the one valve connected to the brew water tank is closed.

10. In a beverage brewing system connectable with a source of water and having a brew basket for holding extract ingredient, and a mixing chamber for receipt of both liquid drink extract and a quantity of diluent water for mixing together into a beverage, the improvement being a control system, comprising:
    a flow meter;
    a controllable delivery system for delivering a quantity of water from the source to the brew basket to make the liquid drink extract and from the source to the mixing chamber for mixing with the drink extract and a controller responsive to the flow meter for selectively controlling the delivery system to deliver only a preselected amount of water to at least one of the brew basket and to the mixing chamber, the controller including means for storing a preselected total quantity of brew water that is to be passed through the brew basket, means for comparing amounts of brew water being measured by the flow meter with the preselected total quantity of brew water, and means responsive to the comparing means to stop the delivery system from passing more brew water to the brew water tank when the measured quantity of brew water has passed to the brew water tank.

11. The beverage brewing system of claim 10 including means for changing the preselected total amount of brew water that is to be passed through the brew basket.

12. The beverage brewing system of claim 10 in which the controller includes means for storing a preselected total quantity of beverage to be made by mixing water passed directly into the mixing chamber with the beverage extract, and means for comparing the total quantity of water measured by the flow meter with the preselected total quantity of beverage to be made, and means responsive to the comparing means to stop the delivery system from passing more water to the mixing chamber when the total measured quantity of water that has passed through the flow meter is equal to the preselected total quantity of beverage to be made.

13. The beverage brewing system of claim 12 including means for selectively changing the preselected total quantity of beverage to be made stored in the storing means.

14. In a beverage brewing system connectable with a source of water and having a brew basket for holding extract ingredient, and a mixing chamber for receipt of both liquid drink extract and a quantity of diluent water for mixing together into a beverage, the improvement being a control system, comprising:

a flow meter;

a controllable delivery system for delivering a quantity of water from the source to the brew basket to make the liquid drink extract and from the source to the mixing chamber for mixing with the drink extract; and a controller responsive to the flow meter for selectively controlling the delivery system to deliver only a preselected amount of water to at least one of the brew basket and to the mixing chamber, the controller including means for storing a preselected total quantity of mixing water that is to be passed through the brew basket, means for comparing amounts of mixing water being measured by the flow meter with the preselected total quantity of mixing water, and means responsive to the comparing means to stop the delivery system from passing more mixing water to the brew water tank when the measured quantity of mixing water that has passed to the brew water tank.

15. The beverage brewing system of claim 14 including means for changing the preselected total amount of mixing water that is to be passed through the brew basket.

16. In a beverage brewing system connectable with a source of water and having a brew basket for holding extract ingredient, and a mixing chamber for receipt of both liquid drink extract and a quantity of diluent water for mixing together into a beverage, the improvement being a control system, comprising:

a flow meter;

a controllable delivery system for delivering a quantity of water from the source to the brew basket to make the liquid drink extract and from the source to the mixing chamber for mixing with the drink extract; and a controller responsive to the flow meter for selectively controlling the delivery system to deliver only a preselected amount of water to at least one of the brew basket and to the mixing chamber, the controller including means for storing a preselected total quantity of beverage to be made by mixing water passed directly into the mixing chamber with the beverage extract, and means for comparing the total quantity of water measured by the flow meter with the preselected total quantity of beverage to be made, and means responsive to the comparing means to stop the delivery system from passing more water to the mixing chamber when the total measured quantity of water that has passed through the flow meter is equal to the preselected total quantity of beverage to be made.

17. The beverage brewing system of claim 16 including means for selectively changing the preselected total quantity of beverage to be made stored in the storing means.

18. In a beverage brewing system connectable with a source of water and having a brew basket for holding extract ingredient, and a mixing chamber for receipt of both liquid drink extract and a quantity of diluent water for mixing together into a beverage, the improvement being a control system, comprising:

a flow meter;

a controllable delivery system for delivering a quantity of water from the source to the brew basket to make the liquid drink extract and from the source to the mixing chamber for mixing with the drink extract; and a controller responsive to the flow meter for selectively controlling the delivery system to deliver only a preselected amount of water to at least one of the brew basket and to the mixing chamber, a level sensor in the brew water tank for sensing when the water has reached a preselected siphon level above which water will be siphoned from the brew water tank, means associated with said controller for controlling the distribution system to pass water into the brew water tank until the level reaches the preselected siphon level, and a siphon connection for passing hot water out from the hot water tank to the brew basket when a substantially equal amount of water from the source is passed through the flow meter and into the brew water tank during a time when the level in the brew water tank is generally at the siphon level.

19. The beverage brewing system of claim 1 including an electrical heater for heating the water in the brew water tank to a preselected, relatively hot, brewing temperature, and in which the water from the water source is relatively cold as compared to the relatively hot brewing temperature.

20. In a beverage brewing system connectable with a source of water and having a brew basket for holding extract ingredient, and a mixing chamber for receipt of both liquid drink extract and a quantity of diluent water for mixing together into a beverage, the improvement being a control system, comprising:
- a flow meter;
- a controllable delivery system for delivering a quantity of water from the source to the brew basket to make the liquid drink extract and from the source to the mixing chamber for mixing with the drink extract, the delivery system including
- a controlled brew valve for passing water from the source and the flow meter to the brew basket, and
- another controlled mixing valve for passing water from the source and the flow meter to the mixing chamber; and
- a controller responsive to the flow meter for selectively controlling the delivery system to deliver only a preselected amount of water to at least one of the brew basket and to the mixing chamber, the controller including
- means responsive to the flow meter and to the controlled mixing valve being open for temporarily storing the quantity of water passed through the controlled mixing valve as mixing water, and
- means responsive to the flow meter and the brew valve being open for temporarily storing the actual quantity of water being passed through the controlled brew valve as brew water.

21. In a beverage brewing system connectable with a source of water and having a brew basket for holding extract ingredient, and a mixing chamber for receipt of both liquid drink extract and a quantity of diluent water for mixing together into a beverage, the improvement being a control system, comprising:
- a flow meter;
- a controllable delivery system for delivering a quantity of water from the source to the brew basket to make the liquid drink extract and from the source to the mixing chamber for mixing with the drink extract; and
- a controller responsive to the flow meter for selectively controlling the delivery system to deliver only a preselected amount of water to at least one of the brew basket and to the mixing chamber, the controller being responsive to the flow meter to control the delivery system to deliver only a preselected amount of brew water to the brew basket and a preselected amount of mixing water to the mixing chamber.

22. The beverage brewing system of claim 21 in which the controller is responsive to the flow meter to control the delivery system to deliver only a preselected total measured quantity of water accumulatively delivered to the brew basket and the mixing chamber.

23. The beverage brewing system of claim 1 including means for heating the water in the brew water tank to a preselected temperature relatively higher than that of the water source.

24. The beverage brewing system of claim 1 in which the brew water tank has an inlet and an outlet, and the distribution system includes a controlled valve interposed between the flow meter and the inlet of the brew water tank.

25. The beverage brewing system of claim 24 including means for heating the water to a preselected temperature at which significant liming may occur, and a valve-less siphon connection for passing relatively hot brew water from the outlet of the brew water tank to the brew basket.

26. The beverage brewing system of claim 25 in which the inlet to the brew water tank is located at a level beneath that of the outlet from the brew water tank.

27. In a beverage brewing system connectable with source of water and having a brew basket for holding extract ingredient, and a mixing chamber for receipt of both liquid drink extract and a quantity of diluent water for mixing together into a beverage, the improvement being a control system, comprising:
- a flow meter;
- a controllable delivery system for delivering a quantity of water from the source to the brew basket to make the liquid drink extract and from the source to the mixing chamber for mixing with the drink extract, the delivery system including
  - a pair of controlled valves for respectively passing water through the flow meter to the brew basket and through the flow meter to the mixing chamber; and
  - a controller responsive to the flow meter for selectively controlling the delivery system to deliver only a preselected amount of water to at least one of the brew basket and to the mixing chamber.

28. In a beverage brewing system connectable with source of water and having a brew basket for holding extract ingredient, and a mixing chamber for receipt of both liquid drink extract and a quantity of diluent water for mixing together into a beverage, the improvement being a control system, comprising:
- a flow meter;
- a controllable delivery system for delivering a quantity of water from the source to the brew basket to make the liquid drink extract and from the source to the mixing chamber for mixing with the drink extract;
- a controller responsive to the flow meter for selectively controlling the delivery system to deliver only a preselected amount of water to at least one of the brew basket and to the mixing chamber;
- another flow meter, and in which
- the delivery system has a pair of controlled valves for respectively passing water through the one flow meter and one of the controlled valves to the brew basket and through the other flow meter and the other of the controlled valves to the mixing chamber.

29. In a beverage brewer, the improvement being a control system, comprising the combination of:
- means for directly measuring with a flow meter substantially independently of flow rate and water pressure a quantity of water being passed to the brewer from an external source of water; and
- means for controlling a water delivery system of the brewer in response to the measuring means.

30. The beverage brewer of claim 29 in which the directly measuring means is a paddle-wheel type quantity flow meter that is substantially independent of flow rate with one of an electrical and an electromagnetic output representative of the revolutions of the paddle-wheel, each revolution being representative of a fixed quantity of water passed by the quantity flow meter.

31. In a beverage brewer, the improvement being a control system, comprising the combination of:
- means for measuring with a flow meter a quantity of water being passed to the brewer from an external source of water; and
- means for controlling a water delivery system of the brewer in response to the measuring means, the controlling means including a computer responsive to the flow meter for controlling the operation of
one controlled valve for passing water directly from the flow meter to a mixing chamber, and
another controlled valve for passing water from the flow meter to the mixing chamber via a brew basket containing brew ingredient.

32. The beverage brewer of claim 29 in which the means for controlling includes
a computer with
a memory for temporarily storing actual amounts of water measured by the flow meter and passed to at least one given location,
a memory for storing a preselected total quantity of water desired to be passed to the at least one given location, and
means for comparing the temporarily stored actual amounts of water with the stored preselected total quantity for the at least one location.

33. The beverage brewer of claim 29 including
a brew basket and a mixing chamber, and
the controlling means includes means for selectively varying proportional amount of water delivered to the brew basket and relative to the amount of water delivered to the mixing chamber.

34. The beverage brewer of claim 33 in which the controlling means includes means for selectively changing the total accumulative amounts of water delivered to both the brew basket and the mixing chamber without changing the proportional amount.

35. The beverage brewer of claim 29 including
a brew basket and a mixing chamber, and
the controlling means includes means for controlling the total accumulative amount delivered to both the brew basket and the mixing chamber.

36. In a beverage brewing system connectable with a source of water and having a brew basket for holding ingredient to be mixed with the water to brew a beverage, the improvement being a control system, comprising:
a controllable delivery system for selectively delivering a water from the source to the brew basket to make the beverage; and
means for connecting the source of water to the controlable delivery system including a quantity meter for directly measuring an actual quantity of water passing from the source to the delivery system substantially independently of water pressure of the source and substantially independently of flow rate of water through the quantity meter; and
a controller responsive to the actual quantity of water directly measured by the flow meter for selectively controlling the delivery system to deliver only a preselected amount of water to the brew basket.

37. The beverage brewer of claim 36 in which the controllable delivery system includes a solenoid controlled shut-off valve for passing water from the source to the brew basket, said quantity meter being in line with the source and the shut-off valve to measure the quantity of water passed by the shut-off valve when in an open state.

38. The beverage brewer of claim 37 in which the controller includes
means for storing a preselected quantity of water to be passed through the brew basket,
means responsive to the quantity meter for comparing the actual quantity of water passed by the shut-off valve as measured by the quantity meter to the stored preselected quantity, and
means for switching the shut-off valve to a closed position in response to the comparing means determining that the actual quantity of water that has passed through the shut-off valve is equal to the stored preselected quantity.

39. The beverage brewer of claim 36 including a hot water tank with a bottom and a top, a siphon tube at a siphon level adjacent the top and an inlet adjacent the bottom and means for connecting the source of water to the inlet to raise the water in the hot water tank to the siphon level.

40. The beverage brewer of claim 39 including
means for sensing when the water level is at the siphon level; and in which
the controller responds to the quantity meter to measure the quantity of water being passed through the meter only when the water in the hot water tank is at the siphon level.

41. The beverage brewer of claim 36 in which the quantity meter includes a paddle-wheel for passing water incrementally through the meter during rotation of the paddle-wheel and means for indicating to the controller the number of rotations of the paddle-wheel, each rotation representing an incremental quantity of water that has passed through the meter.

* * * * *